July 29, 1958 — A. SAMMS — 2,845,241
PARACHUTE RELEASE MECHANISM
Filed Dec. 1, 1955 — 2 Sheets-Sheet 1
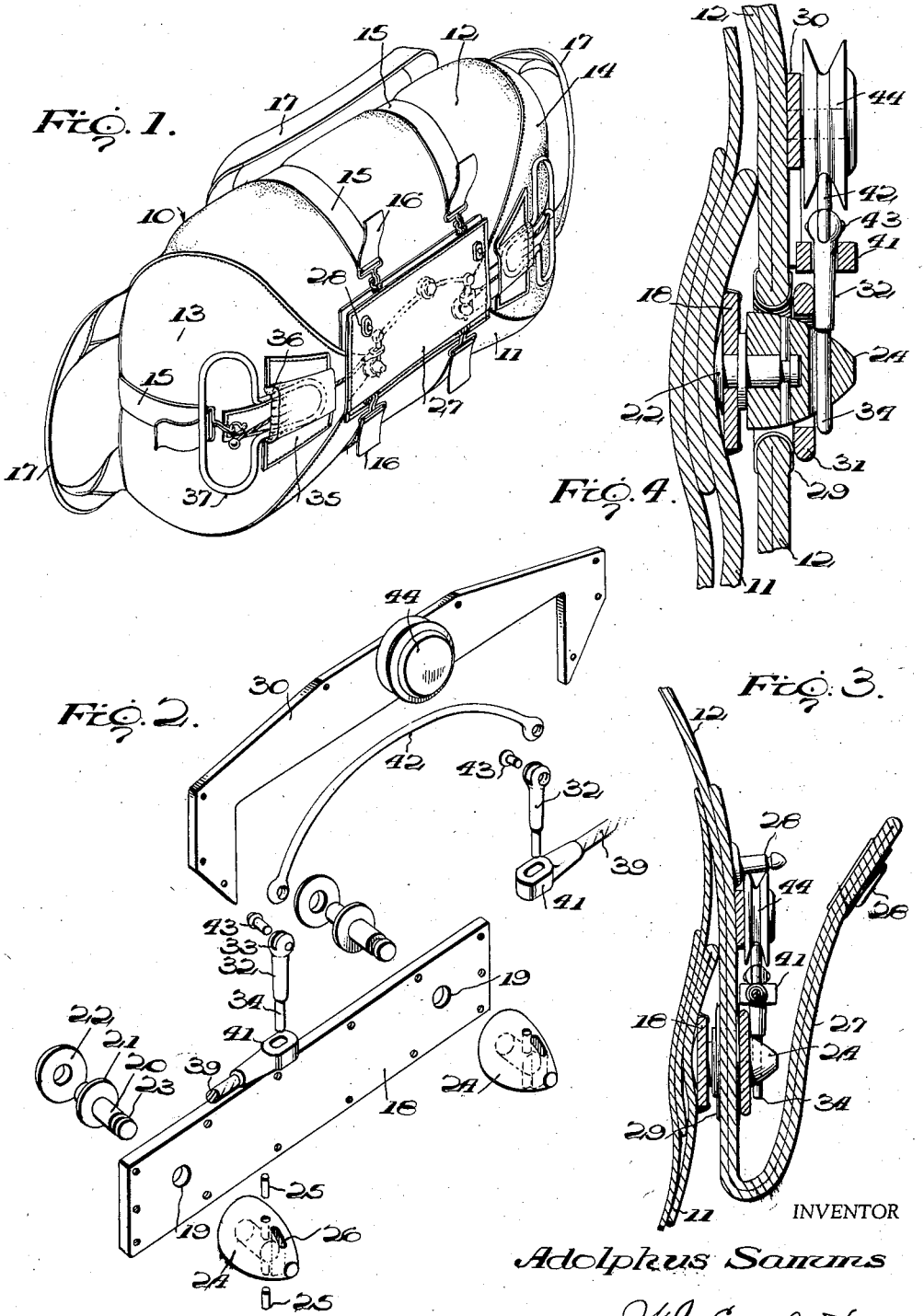
INVENTOR
Adolphus Samms
BY W. J. Eccleston
ATTORNEY

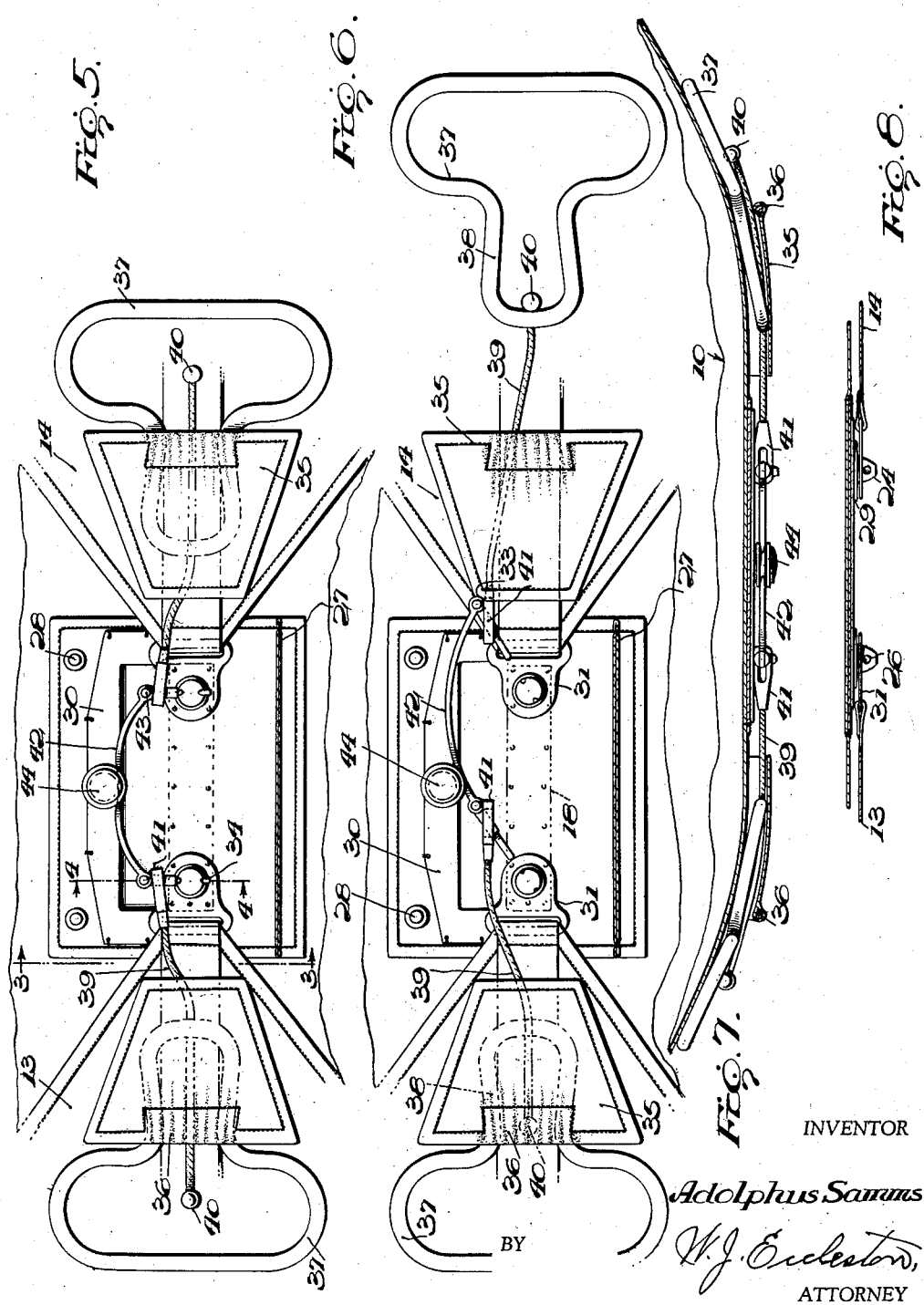

United States Patent Office 2,845,241
Patented July 29, 1958

2,845,241

PARACHUTE RELEASE MECHANISM

Adolphus Samms, United States Army

Application December 1, 1955, Serial No. 550,505

6 Claims. (Cl. 244—148)

(Granted under Title 35, U. S. Code (1952), sec. 266)

The invention described herein, if patented, may be manufactured and used by or for the Government for governmental purposes, without the payment to me of any royalty thereon.

The present invention relates to improvements in parachute apparatus, and more particularly to mechanism for releasing the parachute from the pack in which it is contained.

It is customary for parachute release mechanism to be operated by a pull ring arranged for ready operation by the right hand of the wearer, or alternatively by a static line attached to the airplane from which the wearer jumps. In such arrangements, if for any reason the wearer cannot use his right hand due to injury or to entanglement or otherwise, it is difficult and often impossible for him to reach across his chest with his left hand to operate the pull ring. Such a situation might arise in the use of a reserve parachute when the first parachute did not fully open and its suspension lines or other parts impeded the movements of the wearer, but regardless of the cause of the difficulty, it is highly desirable to provide a parachute which may be released by either hand of the wearer from either side of the parachute pack.

An important object of the present invention is the provision of a parachute release mechanism which may be easily and positively operated by either hand from either side of the packed parachute.

Another object of the invention is to provide a parachute release mechanism of the abovementioned type which is of simple construction, positive operation, and strong and durable in use.

Other objects and advantages of the invention will be apparent during the course of the following description.

In the accompanying drawings which form a part of this specification and wherein like characters of references denote like parts throughout, Figure 1 is a perspective view of a packed parachute embodying the release mechanism of the present invention, Figure 2 is an exploded perspective view of the components of the parachute release mechanism, Figure 3 is a fragmentary view showing the relation of the release mechanism to the parachute pack, the view being taken on approximately the line 3—3 of Figure 5 looking in the direction of the arrows, with the protecting tab pulled away from the release mechanism, Figure 4 is a somewhat similar detail section on the line 4—4 of Figure 5, Figure 5 is an elevation of the release mechanism in its normal closed position, with the protecting tab and portions of the pack being broken away, Figure 6 is a view similar to Figure 5 but showing the parts as one of the pull rings is operating to move the parts to parachute release position;

Figure 7 is a plan view looking down upon the edge of the release mechanism of Figure 5, illustrating the manner in which its parts hug the contour of the parachute pack, and Figure 8 is a similar view illustrating the position of the parts with the cone locking pins removed.

In the drawings, wherein for the purpose of illustration is shown a preferred embodiment of the invention, the numeral 10 designates a parachute pack of the usual construction, and which as viewed in Figure 1 has a lower side flap 11, an upper side flap 12, and two end flaps 13 and 14, said flaps overlapping at their ends and cooperating with the back of the pack to form a generally rectangular container in which the parachute is carried. Elastic tapes 15 with pull tabs 16, extend around the pack and are detachably secured to the flaps adjacent the release mechanism to forcibly pull the pack flaps away from each other when the release mechanism is actuated to free the parachute. Suitable strap loops 17 are firmly secured to the back of the pack and serve for handling the pack or securing it to the usual harness.

The lower side flap 11 is provided centrally of its upper portion with an elongated strip 18 of metal or other suitable rigid material which is firmly secured, to the flap 11, as by stitching. The strip 18 is disposed in parallel relation to the top edge of the flap and is provided with an opening 19 adjacent each of its ends to receive the studs 20 which are rigidly secured in place by suitable means such as flanges 21 and head caps or washers 22. Each stud 20 is provided adjacent its end with a circumferential groove 23, and the grooved end of the stud is received within the central axial bore of a locking head or cone 24 which in turn is provided with transverse openings to receive set-pins 25 which extend into the groove 23 of the stud to prevent removal of the cone head from the stud while permitting free rotation of the cone on the stud. The pointed end of each stud is provided with the usual transverse bore 26 to receive a suitable locking pin. It will be seen that the cones 24 are maintained in proper spaced relation by the rigid strip 18, and differ from the usual parachute locking cones in that they are rotatable with respect to their studs and to the strips 18.

The lower central portion of the upper side flap 12 is extended to form a substantially rectangular protecting tab 27 adapted to be bent back upon the top of flap 12 and secured thereto by suitable snap fasteners indicated at 28. The lower central portion of side flap 12 overlies the strip 18 in the closed position of the pack, and carries spaced grommets 29 adapted to receive the locking cones 24. In order to maintain the proper spacing of grommets 29 so they may be readily passed over the cones 24, an inverted U-shaped reinforcement 30 is suitably secured to the flap 12, and may be of metal or other suitable material. The short side arms of the reinforcement span the grommets 29 and may be secured thereto if desired, although such connection is not necessary. In addition to the reinforcing members 18 and 30, the flaps 11 and 12 are further strengthened by the provision of additional plies of flap material in the region of the locking cones 24 and grommets 29.

The end flaps 13 and 14 of the pack taper to their ends to which are firmly secured eyelets 31, preferably of metal, which are adapted to fit over the locking cones 24 and over the grommets 29 so that the tapered end flaps 13 and 14 close the end of the pack by overlying the ends of side flaps 11 and 12. A pair of locking pins are provided to lock the pack in closed position by extending through the bores 26 of the cones 24 and engaging the eyelets 31 to prevent removal of eyelets 31 and grommets 29 from the locking cones. Each locking pin comprises a body portion 32 having an enlarged bifurcated head 33 at one end and a reduced extension 34 at the other end of a size to fit within the bores 26 of the cones and of a length greater than the length of such bores 26 so that the extension can be projected through the cone and a substantial distance therebeyond to engage the top of eyelet 31. The body portion 32 of the pin is too large to enter the bore 26 and serves as a limit stop when the pin is inserted in the cone bore 26.

The outer surface of each end flap 13 and 14 is provided adjacent its tapered end with a tapered patch pocket 35 whose narrowed end faces the eyelet 31. The sides of the pocket are stitched to its flap and its ends are open. The larger end of the patch pocket is folded upon itself to form an elastic receiving gathered hem portion 36 which serves as the entrance to the pocket. A closed pull ring 37 for each pocket has a reduced neck portion 38 with slightly tapered sides which diverge away from the main portion of the ring. The neck portion 38 of the ring is adapted to be forced into its pocket 35 and frictionally held therein by the pocket, its elastic hem and the diverging sides of the neck. The main portion of the handle remains outside of the pocket and rests against the end flap ready to be grasped and withdrawn. A metal rip cord or cable 39 extends freely through an opening in the end of the reduced neck 38 of each pull ring and has an enlargement 40 at its end to prevent it from being pulled out of the pull ring. The other end of each cable 39 carries a collar 41 with an elongated bore therein to receive the body portion 32 of one of the locking pins, the head 33 of the pin being larger than the bore of the collar.

A steel spring connecting link 42 has its ends pivotally secured in the bifurcated heads 33 of locking pins 32 by means of suitable bolts or the like 43 which pass through the ends of link 42. The spring link 42 is in the form of a pronounced bow or arc which extends upwardly away from the locking pins 32, as seen in Figures 2, 5 and 6. A roller 44 is mounted, preferably for rotation, on the center portion of the reinforcement 30 and has its periphery grooved to receive the link 42, as shown in Figures 3, 4, and 5. The spring link 42 is preferably circular in cross section, and when forced into the grooved edge of roller 44, it becomes somewhat flattened from its normal bowed shape, and consequently exerts an upward pressure against the roller, as well as some downward pressure against the locking pins 32, as viewed in Figure 5.

When the release mechanism is in its closed and locked position seen in Figure 1, the protecting tab 27 conceals the locking pins, cones and roller 44, being secured in this position by fasteners 28. The roller 44 and cones 24 sustain the tab 27 out of contact with locking pins 33 and connecting link 42 so that the release mechanism is readily operable without interference from the tab 27. The cables 39 are of such length as to extend completely through and beyond the patch pockets 35 in the locked position of the parts, as seen in Figure 5, so that when one of the pull rings 37 is withdrawn from its pocket 35, it will be completely out of the pocket before the enlargement 40 is engaged by the end of the ring to impart movement to the locking pins.

When the wearer needs to release the parachute, he grasps either pull ring 37 and pulls it away from the pack, thereby withdrawing it from its pocket 35. Further movement of the ring causes engagement with enlargement 40 and consequent movement of the cable 39 which acts through collar 41 and locking pin 33 to rotate the locking cone 24 about its stud 20, as illustrated in Figure 6 in which the ring on the right side of the figure has been drawn to the right. As the cone and its locking pin are rotated by the pull on cable 39, connecting link 42 acts to impart the same motion to the other locking pin and cone, the movement of which is away from the pocketed pull ring 37 on the left side of the figure. Such movement is permitted by the length of the left cable 39 which merely slides freely through the end of the pull ring without imparting any motion to the ring in its pocket 35. As the cable continues to move outwardly, the rotation of the cones 24 turns the cone bores 26 into a position approaching the direction of pull of cable 39 so that further movement of the cable acts to withdraw both locking pins 33 from the cone bores 26, as indicated in Figure 6. As soon as the pins leave the cone bores, the pressure of the folded parachute within the pack and the tension of elastic pack tapes 15 act to pull eyelets 31 and grommets 29 over the tops of the tapered cones 24, at which time the pack flaps are thrown open and the parachute released from the pack. Due to the arrangement of the freely rotatable cones 24, connected locking pins 33, cables 39 and pull rings 37, it will be seen that had the left ring in Figures 5 and 6 been withdrawn to the left, the cones would have been rotated to the left and the pins 33 withdrawn from the cones in a leftward direction, thereby releasing the parachute from its pack, the releasing action being the same in either direction of cone rotation.

Although a rigid link could be used to connect the pins 33 to cause simultaneous movement thereof, the use of the bowed spring connecting link 42 has several advantages. It provides a slightly flexible connection between the locking pins and when forced under the grooved roller 44 it tends to press the pins into the cone bores. The action of the roller 44 in flattening the arch of the link 42 in its operative position adds a snap action to removal of the pins from the cone bores. In normal locked position, the center of the spring link is under the roller so that the tendency of the spring to resume its bowed shape is resisted by the roller and results in an inward pressure on the pins 33. However, when the cones are rotated by a pull on one of cables 39, the link moves laterally with respect to the roller so that as the center of the link moves away from the roller, the tendency of the link to resume its arched form will result in a sudden rise in the center of the link which will push the arched link away from the roller and assist in the withdrawing of the pins from the cone bores.

The two pull rings 37 are disposed in a snug position against the ends of the parachute packs, normally out of the way but readily accessible for right or left hand operation. The cones and locking pins are separated by a pull on either of the pull rings, and the top surfaces of the eyelets 31 present a smooth sliding surface for engagement with the ends of pins 33 as they are rotated with the cones towards their release position. The strip 18 and reinforcement 30 maintain the cones and grommets in properly spaced position so that there is no danger of binding of the parts.

While I have shown and described the preferred embodiment of the invention, it is to be understood that various changes in the size, shape and arrangement of parts may be resorted to without departing from the spirit of the invention or the scope of the subjoined claims.

I claim:

1. The combination with a parachute pack having overlapping flaps and cooperating rotatable locking cones and grommets for holding the flaps closed about a parachute, of release mechanism for releasing the grommets from the locking cones and comprising a pair of locking pins projecting through openings in the locking cones, a cable connected to the other pin and extending toward one edge of the pack, a second cable connected to the other pin and extending toward the opposite edge of the pack, and means operatively connecting the pins to withdraw both pins from the cones when either of the cables is moved in the direction of its length away from the locking pins.

2. A release mechanism according to claim 1, in which each of the cables is provided with a manual pull ring removably secured adjacent an edge of the pack.

3. The combination with a parachute pack having a closure, of a fastening and release mechanism for the closure comprising a rotatable head having a transverse opening therein, a locking pin extending into the opening in the head, a rip cord connected to said locking pin and extending and movable in a direction substantially normal to the pin, and a second rip cord connected to said pin and extending and movable in a direction diametrically opposite to that of the first-named rip cord, said rip cords being connected to the pin adjacent the same end of the pin, whereby a substantial movement of either of the rip cords in the direction of its length away from the locking pin and head will first rotate the head to a position with its transverse opening extending in a direction approaching alignment with the rip cord and will then withdraw the locking pin from the head.

4. A release mechanism according to claim 3, in which each of the rip cords is provided with a manual pull ring removably secured adjacent an edge of the pack.

5. The combination with a parachute pack having a closure, of a fastening and release mechanism for the closure comprising a pair of spaced rotatable heads having openings therein extending transversely to their axes, a locking pin extending into the opening in each head, a link pivotally connecting ends of the locking pins, a rip cord connected to one of the pins adjacent its link end and extending in a direction substantially normal to the pin, and a second rip cord connected to the other pin adjacent its link end and extending in a direction diametrically opposite to that of the first-named rip cord, whereby a substantial movement of either rip cord in the direction of its length away from the locking pins and heads will first rotate the heads to a position with their transverse openings extending in a direction approaching alignment with the rip cord and will then withdraw the locking pins from the openings in the heads.

6. The combination with a parachute pack having a closure, of a fastening and release mechanism for the closure comprising a pair of spaced rotatable heads having openings therein extending transversely to their axes, a locking pin extending into the opening in each head, a link pivotally connecting ends of the locking pins, a rip cord connected to one of the pins adjacent its link end and extending in a direction substantially normal to the pin, and a second rip cord connected to the other pin adjacent its link end and extending in a direction diametrically opposite to that of the first-named rip cord, whereby a substantial movement of either rip cord in the direction of its length away from the locking pins and heads will first rotate the heads to a position with their transverse openings extending in a direction approaching alignment with the rip cord and will then withdraw the locking pins from the openings in the heads, said link being of spring material and being normally bowed away from the pins, and a roller engaging the spring link intermediate its ends and forcing it into a somewhat flattened position, whereby rotation of the locking heads will move the intermediate portion of the spring link laterally away from the roller so that the tendency for the link to resume its original bowed shape will assist the withdrawal of the locking pins from the openings in the heads.

References Cited in the file of this patent

UNITED STATES PATENTS 2,102,541     Lundholm _____ Dec. 14, 1937

FOREIGN PATENTS 444,808     Great Britain _____ Mar. 27, 1936

UNITED STATES PATENT OFFICE
CERTIFICATE OF CORRECTION

Patent No. 2,845,241                                                          July 29, 1958

Adolphus Samms

It is hereby certified that error appears in the printed specification of the above numbered patent requiring correction and that the said Letters Patent should read as corrected below.

Column 4, line 63, for "the other pin" read --one of the pins--.

Signed and sealed this 7th day of October 1958.

(SEAL)
Attest:

KARL H. AXLINE                                        ROBERT C. WATSON

Attesting Officer                                    Commissioner of Patents